(12) United States Patent
Lane et al.

(10) Patent No.: US 8,496,130 B2
(45) Date of Patent: Jul. 30, 2013

(54) HOT-FILL CONTAINER HAVING MOVABLE RIBS FOR ACCOMMODATING VACUUM FORCES

(75) Inventors: Michael T. Lane, Brooklyn, MI (US); Rohit V. Joshi, Ann Arbor, MI (US); John B. Simon, Farmington Hills, MI (US)

(73) Assignee: Amcor Limited, Hawthorn (AU)

( * ) Notice: Subject to any disclaimer, the term of this patent is extended or adjusted under 35 U.S.C. 154(b) by 565 days.

(21) Appl. No.: 12/464,336

(22) Filed: May 12, 2009

(65) Prior Publication Data

US 2009/0283495 A1 Nov. 19, 2009

Related U.S. Application Data

(60) Provisional application No. 61/127,621, filed on May 14, 2008.

(51) Int. Cl.
*B65D 1/46* (2006.01)
*B29C 49/10* (2006.01)

(52) U.S. Cl.
USPC ............ 215/381; 215/383; 220/675; 264/523

(58) Field of Classification Search
USPC ................. 215/379, 381–383, 900; 220/669, 220/675, 673
See application file for complete search history.

(56) References Cited

U.S. PATENT DOCUMENTS

| | | | |
|---|---|---|---|
| 3,297,194 A * | 1/1967 | Caldwell et al. | 220/672 |
| 4,497,855 A | 2/1985 | Agrawal et al. | |
| 4,610,366 A * | 9/1986 | Estes et al. | 426/106 |
| 4,818,575 A * | 4/1989 | Hirata et al. | 428/36.7 |
| 5,632,397 A * | 5/1997 | Fandeux et al. | 215/382 |
| 5,704,504 A * | 1/1998 | Bueno | 215/381 |
| 6,230,912 B1 * | 5/2001 | Rashid | 215/383 |
| 6,929,139 B2 * | 8/2005 | Darr | 215/382 |
| 7,228,981 B2 | 6/2007 | Chisholm | |
| 7,296,701 B2 * | 11/2007 | Ozawa et al. | 215/381 |
| 7,374,055 B2 * | 5/2008 | Hatcher et al. | 215/381 |
| 7,798,349 B2 * | 9/2010 | Maczek et al. | 215/381 |
| 2008/0197105 A1 * | 8/2008 | Boukobza | 215/381 |

FOREIGN PATENT DOCUMENTS

| | | |
|---|---|---|
| FR | 1 408 869 | 8/1965 |
| GB | 2 025 889 | 1/1980 |
| WO | WO 01/12511 | 2/2001 |
| WO | WO 2007006880 A1 * | 1/2007 |
| WO | WO 2007/054449 | 5/2007 |

OTHER PUBLICATIONS

Supplementary European Search Report and European Search Opinion dated Sep. 23, 2011 from co-pending European Patent Appl. No. EP 09 74 7419 (5 pages).

* cited by examiner

*Primary Examiner* — Sue A Weaver
(74) *Attorney, Agent, or Firm* — Harness, Dickey & Pierce, P.L.C.

(57) ABSTRACT

A one-piece plastic container includes a container body and an upper portion having a finish. Integrally formed with the finish and extending downward therefrom is a shoulder region. The shoulder region merges into and provides a transition between the finish and a sidewall portion. The sidewall portion extends downward from the shoulder region to a base portion having a base. The sidewall portion defines a series of horizontal lands and horizontal ribs. The horizontal lands and horizontal ribs extend continuously in a vertical direction from the shoulder region to the base portion. The horizontal ribs are designed to achieve optimal performance with regard to vacuum absorption, top load strength capabilities and dent resistance.

20 Claims, 6 Drawing Sheets

HOT-FILL CONTAINER HAVING MOVABLE RIBS FOR ACCOMMODATING VACUUM FORCES

CROSS-REFERENCE TO RELATED APPLICATIONS

This application claims the benefit of U.S. Provisional Application No. 61/127,621, filed on May 14, 2008. The entire disclosure of which is incorporated herein by reference.

TECHNICAL FIELD

This disclosure generally relates to plastic containers for retaining a commodity, such as a solid or liquid commodity. More specifically, this disclosure relates to a one-piece blown container having a series of horizontal ribs designed to achieve optimal performance with regard to vacuum absorption, top load strength capabilities and dent resistance.

BACKGROUND

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Typically, an upper portion of the plastic container defines an opening. This upper portion is commonly referred to as a finish and includes some means for engaging a cap or closure to close off the opening. In the traditional injection-stretch blow molding process, the finish remains substantially in its injection molded state while the container body is formed below the finish. The finish may include at least one thread extending radially outwardly around an annular sidewall defining a thread profile. In one application, a closure member or cap may define a complementary thread, or threads, that are adapted to cooperatively mate with the threads of the finish.

In some applications, plastic containers must withstand extreme temperatures and pressures, while providing an improved heat resistance and an ability to withstand vacuum forces at a reduced weight as compared to traditional designs. In other examples, conventional plastic containers that are cylindrical in profile, do not include a sidewall design with adequate vertical load bearing and dent resistance capabilities and properties.

Thus, there is a need for a plastic container design having a sidewall capable of achieving optimal performance with regard to vacuum absorption, top load strength capabilities and dent resistance.

SUMMARY

A one-piece plastic container according to the present disclosure defines a container body, and includes an upper portion having a finish. Integrally formed with the finish and extending downward therefrom is a shoulder region. The shoulder region merges into and provides a transition between the finish and a sidewall portion. The sidewall portion extends downward from the shoulder region to a base portion having a base. The sidewall portion can define a series of horizontal lands and horizontal ribs. The horizontal lands and horizontal ribs can extend continuously in a vertical direction from the shoulder region to the base portion.

According to yet other features, the finish defines a means for attaching a closure thereon. The means for attaching a closure includes at least one thread. The container is composed of polyethylene terephthalate. The sidewall portion and the base portion are biaxially oriented.

Additional benefits and advantages of the present disclosure will become apparent to those skilled in the art to which the present disclosure relates from the subsequent description and the appended claims, taken in conjunction with the accompanying drawings. It will also be appreciated by those skilled in the art to which the present disclosure relates that the container of the present disclosure may be manufactured utilizing alternative blow molding processes to those disclosed.

DETAILED DESCRIPTION

The following description is merely exemplary in nature, and is in no way intended to limit the disclosure or its application or uses.

FIGS. 1-4, 6 and 7 show one preferred embodiment of the present container. In the Figures, reference number 10 designates a one-piece plastic, e.g. polyethylene terephthalate (PET), container. The plastic container 10 can define a longitudinal axis L (FIG. 2) and be substantially cylindrical in cross section. In this particular embodiment, the plastic container 10 has a volume capacity of about 20 fl. oz. (591 cc). Those of ordinary skill in the art would appreciate that the following teachings of the present disclosure are applicable to other containers, such as rectangular, triangular, hexagonal, octagonal or square shaped containers, which may have different dimensions and volume capacities. It is also contemplated that other modifications can be made depending on the specific application and environmental requirements.

Figure 1:
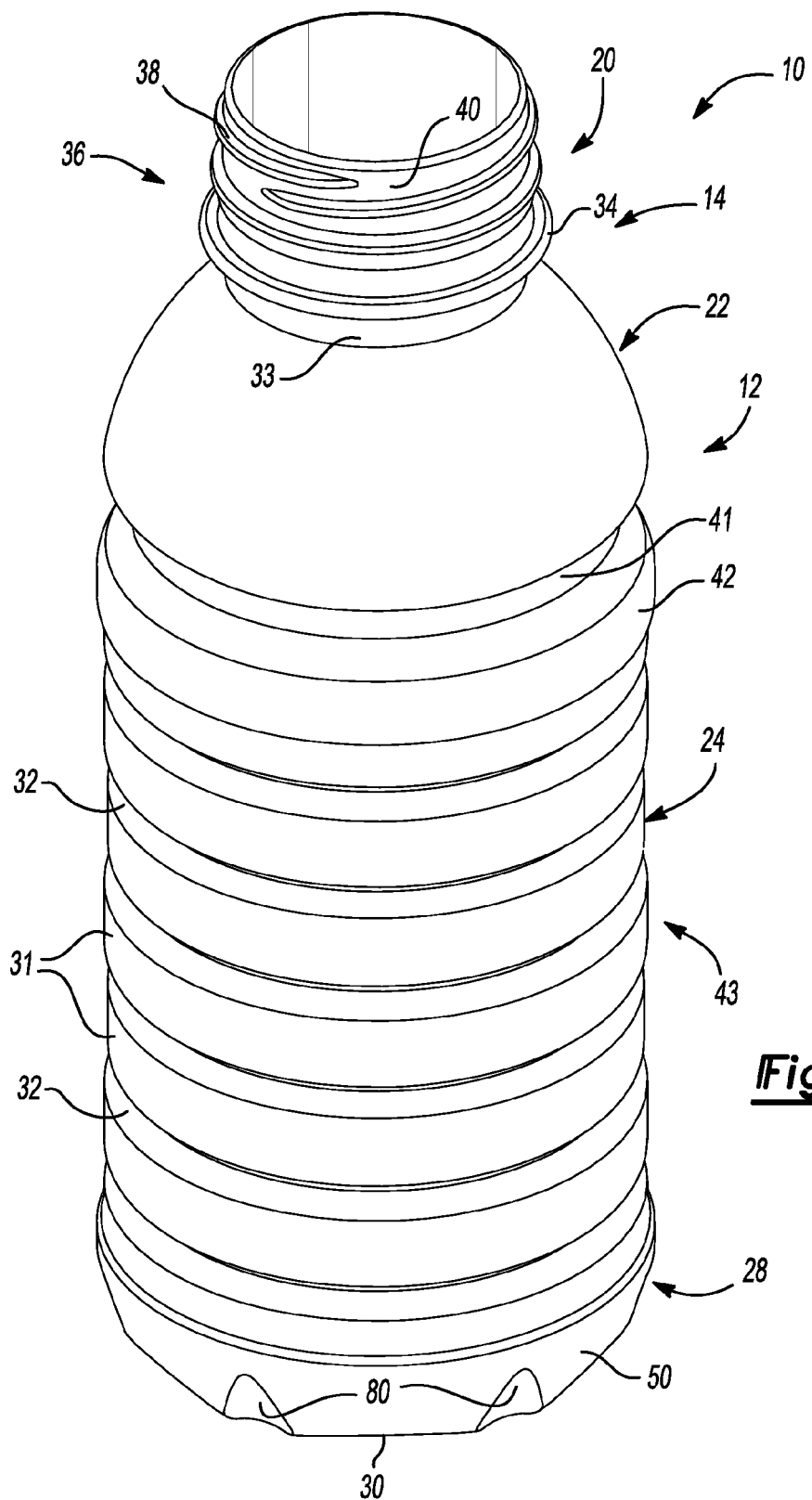
FIG. 1 is a side elevational view of a one-piece plastic container constructed in accordance with the teachings of the present disclosure.

As shown in FIG. 1, the one-piece plastic container 10 according to the present teachings defines a container body 12, and includes an upper portion 14 having a finish 20. Integrally formed with the finish 20 and extending downward therefrom is a shoulder region 22. The shoulder region 22 merges into and provides a transition between the finish 20 and a sidewall portion 24. The sidewall portion 24 extends downward from the shoulder region 22 to a base portion 28 having a base 30. The sidewall portion 24 can define a series of horizontal lands 31 and horizontal ribs 32. The horizontal lands and horizontal ribs 31 and 32, respectively can extend continuously in a vertical direction from the shoulder region 22 to the base portion 28.

A neck 33 may also be included having an extremely short height, that is, becoming a short extension from the finish 20, or an elongated height, extending between the finish 20 and the shoulder region 22. A support ring 34 can be defined on the neck 33. The finish 20 further includes a threaded region 36 having at least one thread 38 formed on an annular sidewall 40. The threaded region 36 provides a means for attachment of a similarly threaded closure or cap (not shown). The cap can define at least one thread formed around an inner diameter for cooperatively riding along the thread(s) 38 of the finish 20. Alternatives may include other suitable devices that engage the finish 20 of the plastic container 10. Accordingly, the closure or cap engages the finish 20 to preferably provide a hermetical seal of the plastic container 10. The closure or cap is preferably of a plastic or metal material conventional to the closure industry and suitable for subsequent thermal processing, including high temperature pasteurization and retort. A transition rib 41 and a transition land 42 can be defined on the sidewall portion 24 and marks a transition between the shoulder region 22 and a label panel area 43. The label panel area 43 therefore, can be defined between the transition land 42 and the base portion 28. It is appreciated that because the plastic container 10 incorporates the transition rib 41 and the transition land 42, the series of horizontal lands 31 and horizontal ribs 32 can extend continuously from the transition land 42 to the base portion 28.

The plastic container 10 may include as few as three (3) horizontal ribs 32 and as many as nine (9) horizontal ribs 32. As shown in the cross sectional view of FIG. 6, horizontal ribs 32 further include an upper wall 45 and a lower wall 46 separated by an inner curved wall 47. Inner curved wall 47 is curved non-linearly between the upper wall 45 and the lower wall 46 in the cross section of FIG. 6. The inner curved wall 47 is in part defined by a relatively sharp innermost radius r1. Preferably, sharp innermost radius r1 lies within the range of about 0.01 inches to about 0.03 inches. The relatively sharp innermost radius r1 of inner curved wall 47 facilitates improved material flow during blow molding of the plastic container 10 thus enabling the formation of relatively deep horizontal ribs 32.

Horizontal ribs 32 each further include an upper outer transition 37 at least partially defined by an upper outer radius r2 and a lower outer transition 39 at least partially defined by a lower outer radius r3. Preferably both the upper outer radius r2 and the lower outer radius r3 each lie within the range of about 0.07 inches to about 0.14 inches. The upper outer radius r2 and the lower outer radius r3 may be equal to each other or differ from one another. Preferably the sum of the upper outer radius r2 and the lower outer radius r3 will be equal to or greater than about 0.14 inches and less than about 0.28 inches.

Figure 6:
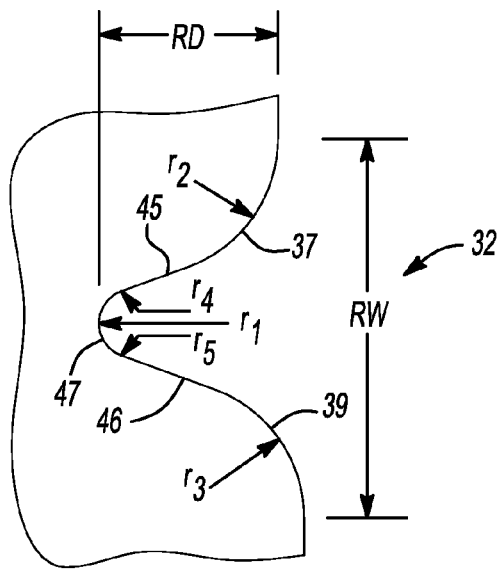
FIG. 6 is an enlarged side view of a single horizontal rib within the sidewall of the one-piece plastic container of FIG. 1.

As shown in FIG. 6, horizontal ribs 32 further include an upper inner radius r4 and a lower inner radius r5. The upper inner radius r4 and the lower inner radius r5 each lie within the range of about 0.08 inches to about 0.11 inches. The upper inner radius r4 and the lower inner radius r5 may be equal to each other or differ from one another. Preferably the sum of the upper inner radius r4 and the lower inner radius r5 will be equal to or greater than about 0.16 inches and less than about 0.22 inches.

Horizontal ribs 32 have a rib depth RD of about 0.12 inches and a rib width RW of about 0.22 inches as measured from the upper extent of the upper outer radius r2 and the lower extent of the lower outer radius r3. As such, horizontal ribs 32 each have a rib width RW to rib depth RD ratio. The rib width RW to rib depth RD ratio is preferably in the range of about 1.6 to about 2.0.

Horizontal ribs 32 are designed to achieve optimal performance with regard to vacuum absorption, top load strength and dent resistance. Horizontal ribs 32 are designed to compress slightly in a vertical direction to accommodate for and absorb vacuum forces resulting from hot-filling, capping and cooling of the container contents. Horizontal ribs 32 are designed to compress further when the filled container is exposed to excessive top load forces.

Figure 7:
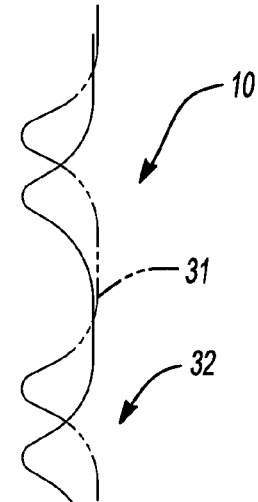
FIG. 7 is an enlarged side view of the sidewall of the one-piece plastic container of FIG. 1 comparing an empty container versus a hot-filled, capped and cooled container.
Figure 7:
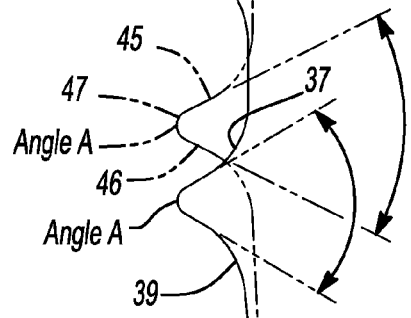
Figure 7:
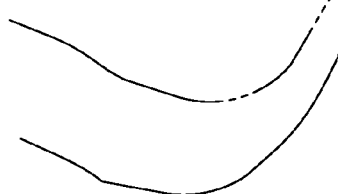

As shown in FIG. 7, the upper wall 45 and the lower wall 46 define a rib angle A. Specifically, in FIG. 7, imaginary lines project from the upper and lower walls 45, 46, respectively, in FIG. 7, and the angle A is defined therebetween. As shown in FIG. 7, the imaginary lines do not intersect the transitions 46, 47 and are, instead, tangential to the transitions 37, 39. The rib angle A of an unfilled plastic container 10 may be about 58 degrees. After hot-filling, capping and cooling of the container contents, the resultant vacuum forces cause the rib angle A to reduce to about 55 degrees (shown in phantom in FIG. 7). This represents a reduction of the rib angle A of about 3 degrees as a result of vacuum forces present within the plastic container 10 representing a reduction in the rib angle A of about 5%. Preferably, the rib angle A will be reduced by at least about 3% and no more than about 8% as a result of vacuum forces.

After filling, it is common for the plastic container 10 to be bulk packed on pallets. Pallets are then stacked atop one another resulting in top load forces being applied to the plastic container 10 during storage and distribution. Thus, horizontal ribs 32 are designed so that the rib angle A may be further reduced to absorb top load forces. However, horizontal ribs 32 are designed so that the upper wall 45 and the lower wall 46 never come into contact with each other as a result of vacuum or top load forces. Instead horizontal ribs 32 are designed to allow the plastic container 10 to reach a state wherein the plastic container 10 is supported in part by the product inside when exposed to excessive top load forces thereby preventing permanent distortion of the plastic container 10. In addition, this enables horizontal ribs 32 to rebound and return substantially to the same shape as before the top load forces were applied, once such top load forces are removed.

Horizontal lands 31 are generally flat in vertical cross-section as molded. When the plastic container 10 is subjected to vacuum and/or top load forces, horizontal lands 31 are designed to bulge slightly outward in vertical cross-section to aid the plastic container 10 in absorbing these forces in a uniform way.

The plastic container 10 has been designed to retain a commodity. The commodity may be in any form such as a solid or liquid product. In one example, a liquid commodity may be introduced into the container during a thermal process, typically a hot-fill process. For hot-fill bottling applications, bottlers generally fill the plastic container 10 with a liquid or product at an elevated temperature between approximately 155° F. to 205° F. (approximately 68° C. to 96° C.) and seal the plastic container 10 with a cap or closure before cooling. In addition, the plastic container 10 may be suitable for other high-temperature pasteurization or retort filling processes or other thermal processes as well. In another example, the commodity may be introduced into the plastic container 10 under ambient temperatures.

Figure 5:
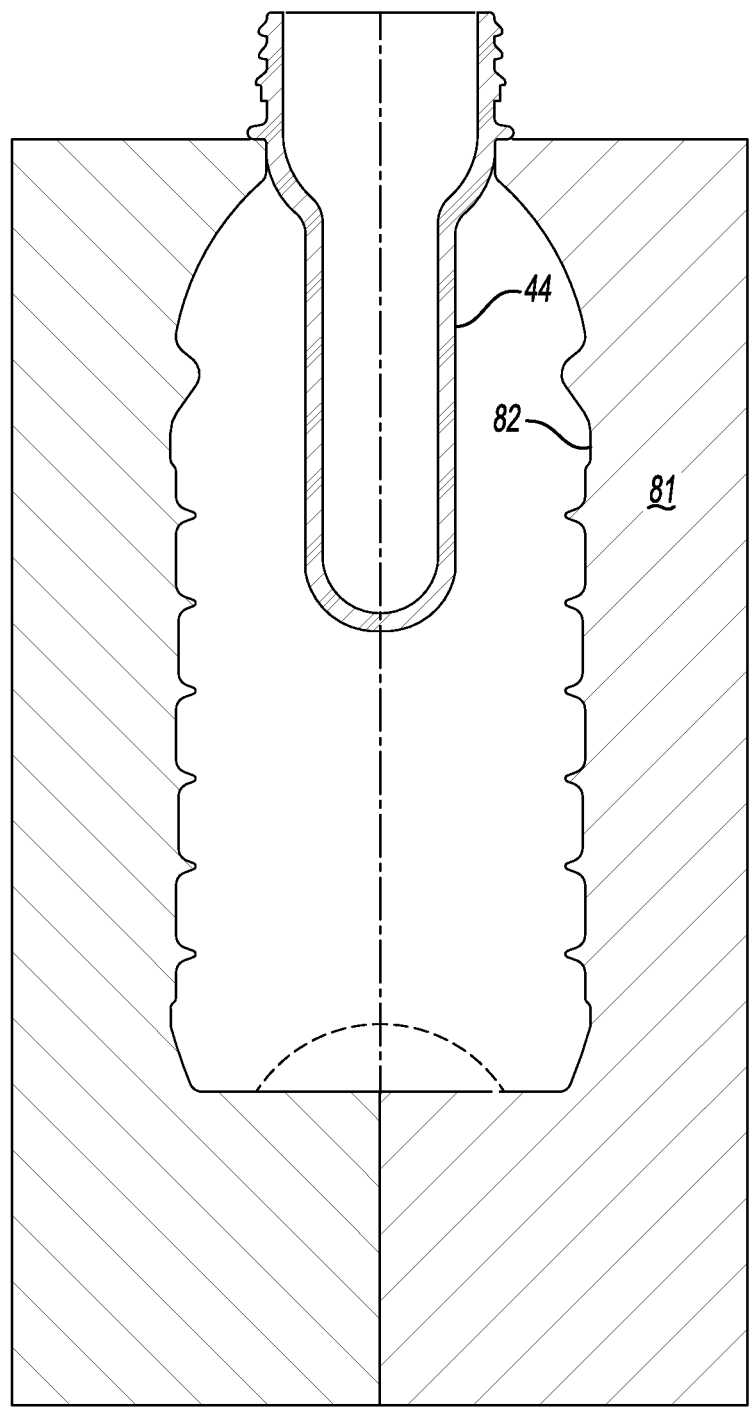
FIG. 5 is a sectional view of an exemplary mold cavity used during formation of the container of FIG. 1 and shown with a preform positioned therein.

The plastic container 10 of the present disclosure is an injection-stretch blow molded, biaxially oriented container with a unitary construction from a single or multi-layer material. A well-known stretch-molding, heat-setting process for making the one-piece plastic container 10 generally involves the manufacture of a preform 44 (FIG. 5) of a polyester material, such as polyethylene terephthalate (PET), having a shape well known to those skilled in the art similar to a test-tube with a generally cylindrical cross section and a length typically approximately fifty percent (50%) that of the resultant container height. In one example, the preform 44 can be injection molded. As will be appreciated, the upper portion 14 remains substantially unchanged from its preform state while the container body 12 is formed below the finish 20. An exemplary method of manufacturing the plastic container 10 will be described in detail below.

Figure 2:
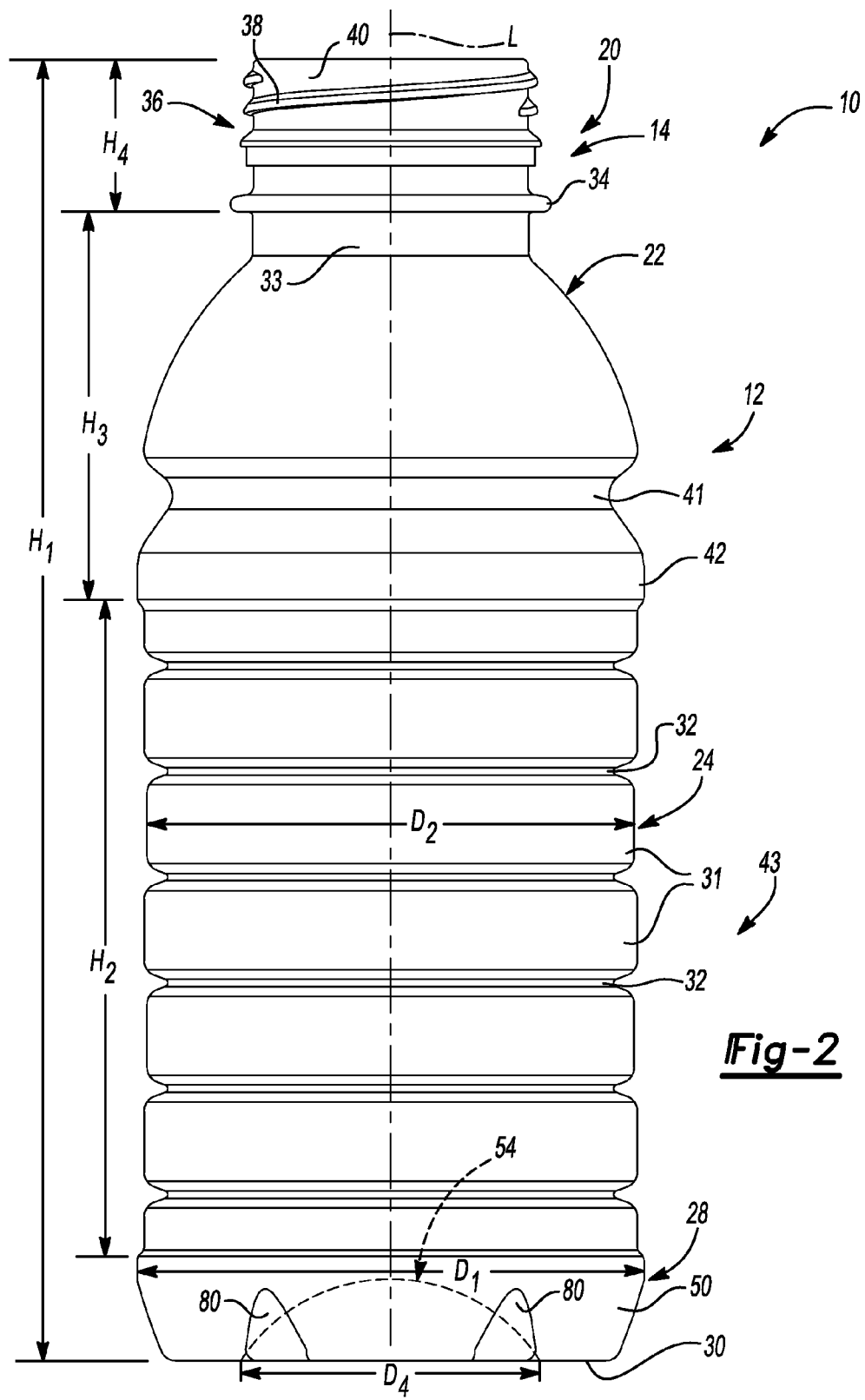
FIG. 2 is a side view of the one-piece plastic container of FIG. 1.

Turning specifically now to FIG. 2, exemplary dimensions for the plastic container will be described. It is appreciated that other dimensions may be used. The plastic container 10 has an overall height $H_1$ of about 187.65 mm (7.39 inches). A height $H_2$ of the label panel area 43 may be 89.45 mm (3.52 inches). A height $H_3$ taken from the top of the label panel area 43 and the bottom of the support ring 34 may be 65.52 mm (2.58 inches). A height $H_4$ taken from the bottom of the support ring 34 and the top of the plastic container 10 may be 18.31 mm (0.72 inches). A diameter $D_1$ taken at the widest portion of the base portion 28 may be 74.22 mm (2.92 inches). A diameter $D_2$ taken at each of the horizontal lands 31 may be 73.48 mm (2.89 inches).

Figure 3:
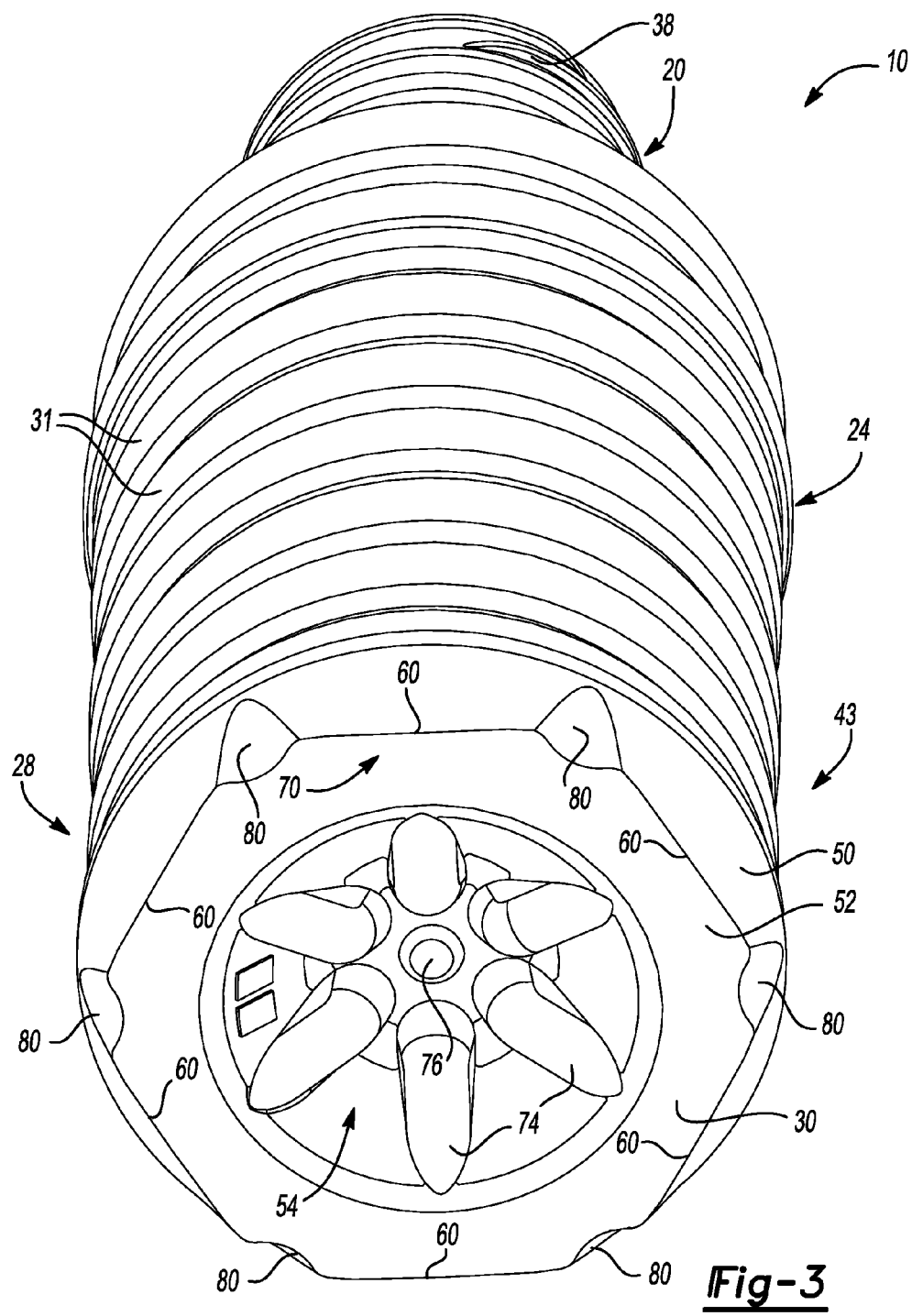
FIG. 3 is a bottom elevational view of the one-piece plastic container of FIG. 1.
Figure 4:
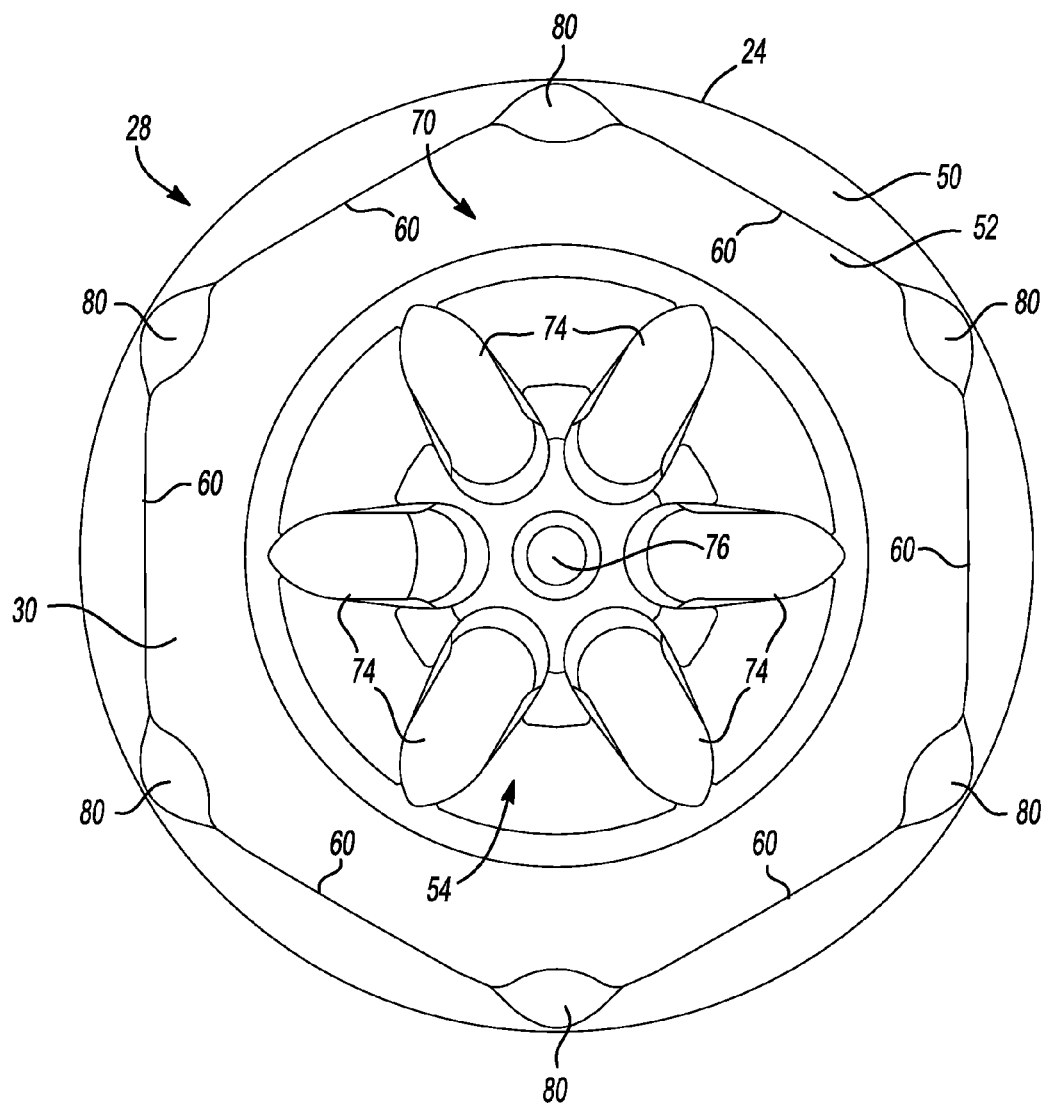
FIG. 4 is a bottom view of the one-piece plastic container of FIG. 1.

With specific reference now to FIGS. 3 and 4, the base portion 28 will be described in detail. The base portion 28 defines a radial sidewall 50 that transitions between the sidewall portion 24 and the base 30. The base 30 defines a continuous contact surface 52 defined generally between the radial sidewall 50 and a central pushup portion 54. A plurality of facets 60 are defined at a transition between the radial sidewall 50 and the continuous contact surface 52. The facets 60 can be generally linear. The continuous contact surface 52 is generally planar and defines a contact surface area 70 for supporting the plastic container 10 in an upright position. The central pushup portion 54 defines a plurality of radially arranged support ridges 74. The radially arranged support ridges 74 centrally converge toward a nub 76. As illustrated in FIG. 2, the central pushup portion 54 can define a diameter $D_4$ of 57.15 mm (2.25 inches). A plurality of modulating vertical detent ribs 80 are defined on the base portion 28 generally at a transition between the continuous contact surface 52 and the sidewall portion 24. While the example shown illustrates six (6) detent ribs 80, more or fewer detent ribs 80 may be formed on the base portion 28.

The detent ribs 80 are formed at a transition between adjacent facets 60. As a result, an otherwise sharp transition between adjacent facets 60 is de-emphasized. The resultant base portion 28 provides improved base stiffness (such as in the vertical direction) and strength of the plastic container 10 as a whole.

The plastic container 10 molded with the geometrical relationships according to the instant disclosure can be produced on high-speed blow-molding production platforms without compromising the functionality of the base portion 28 or the resultant plastic container 10 as a whole.

In one example, a machine (not illustrated) places the preform 44 heated to a temperature between approximately 190° F. to 250° F. (approximately 88° C. to 121° C.) into a mold cavity 81 (see FIG. 5). The mold cavity 81 may be heated to a temperature between approximately 250° F. to 350° F. (approximately 121° C. to 177° C.). A stretch rod apparatus (not illustrated) stretches or extends the heated preform 44 within the mold cavity 81 to a length approximately that of the resultant plastic container 10 thereby molecularly orienting the polyester material in an axial direction generally corresponding with the central longitudinal axis L of the plastic container 10. Again, during the stretching process, the finish 20 remains unchanged in an injection molded state while the container body 12 is formed below the finish 20. While the stretch rod extends the preform 44, air having a pressure between 300 PSI to 600 PSI (2.07 MPa to 4.14 MPa) assists in extending the preform 44 in the axial direction and in expanding the preform 44 in a circumferential or hoop direction thereby substantially conforming the polyester material to the shape of the mold cavity 81 and further molecularly orienting the polyester material in a direction generally perpendicular to the axial direction, thus establishing the biaxial molecular orientation of the polyester material in most of the plastic container 10. The pressurized air holds the mostly biaxial molecularly oriented polyester material against a mold surface 82 of the mold cavity 81 for a period of approximately two (2) to five (5) seconds before removal of the plastic container 10 from the mold cavity 81. This process is known as heat setting and results in a heat-resistant container suitable for filling with a product at high temperatures. The disclosed sidewall configuration improves ease of manufacture and results in more consistent material distribution in the sidewall.

In another example, a machine (not illustrated) places the preform 44 heated to a temperature between approximately 185° F. to 239° F. (approximately 85° C. to 115° C.) into the mold cavity 81. The mold cavity 81 may be chilled to a temperature between approximately 32° F. to 75° F. (approximately 0° C. to 24° C.). A stretch rod apparatus (not illustrated) stretches or extends the heated preform 44 within the mold cavity 81 to a length approximately that of the resultant plastic container 10 thereby molecularly orienting the polyester material in an axial direction generally corresponding with the central longitudinal axis L of the plastic container 10. Again, during the stretching process, the finish 20 remains unchanged in an injection molded state while the container body 12 is formed below the finish 20. While the stretch rod extends the preform 44, air having a pressure between 300

PSI to 600 PSI (2.07 MPa to 4.14 MPa) assists in extending the preform 44 in the axial direction and in expanding the preform 44 in a circumferential or hoop direction thereby substantially conforming the polyester material to the shape of the mold cavity 81 and further molecularly orienting the polyester material in a direction generally perpendicular to the axial direction, thus establishing the biaxial molecular orientation of the polyester material in most of the plastic container 10. The pressurized air holds the mostly biaxial molecularly oriented polyester material against the mold surface 82 of the mold cavity 81 for a period of approximately two (2) to five (5) seconds before removal of the plastic container 10 from the mold cavity 81. This process is utilized to produce containers suitable for filling with product under ambient conditions or cold temperatures.

Alternatively, other manufacturing methods using other conventional materials including, for example, high density polyethylene, polypropylene, polyethylene naphthalate (PEN), a PET/PEN blend or copolymer, and various multilayer structures may be suitable for the manufacture of the plastic container 10. Those having ordinary skill in the art will readily know and understand plastic container manufacturing method alternatives.

While the above description constitutes the present disclosure, it will be appreciated that the disclosure is susceptible to modification, variation and change without departing from the proper scope and fair meaning of the accompanying claims.

What is claimed is:

1. A one-piece plastic container comprising:
an upper portion, a sidewall portion and a base portion, said sidewall portion being integrally formed with and extending from said upper portion to said base portion, said base portion closing off an end of the container; said sidewall portion defined in part by a plurality of horizontal ribs arranged substantially perpendicular to a longitudinal axis of the container, at least one of the horizontal ribs being disposed longitudinally between an upper land and lower land, a cross section of the at least one of the horizontal ribs taken parallel to the longitudinal axis being defined by an upper wall, a lower wall, and an inner curved wall that extends between the upper and lower walls, the inner curved wall being curved along an innermost radius, the at least one of the horizontal ribs transitioning to the upper land along an upper outer radius, the at least one of the horizontal ribs transitioning to the lower land along a lower outer radius, a sum of the upper and lower radii being at least 0.14 inches and at most 0.28 inches, the at least one of the horizontal ribs defining an acute angel that is variable according to vacuum forces generated within the container to thereby accommodate the vacuum forces.

2. The one-piece plastic container of claim 1 wherein said acute angle is also variable according to a load on the container directed parallel to the longitudinal axis to thereby accommodate the load.

3. The one-piece plastic container of claim 2 wherein said plurality of horizontal ribs are equidistantly spaced.

4. The one-piece plastic container of claim 1 wherein said innermost radius measures between approximately 0.01 inches and approximately 0.03 inches.

5. The one-piece plastic container of claim 4 wherein said horizontal ribs further define a horizontal rib width and a horizontal rib depth.

6. The one-piece plastic container of claim 5 wherein a ratio of said horizontal rib width to said horizontal rib depth is preferably within a range of about 1.6 to about 2.0.

7. The one-piece plastic container of claim 1 wherein said acute angle varies between a first angle when the container is molded and empty, and a second angle when the container is filled, capped and cooled, wherein a measure of said first angle is greater than a measure of said second angle.

8. The one-piece plastic container of claim 1, wherein the at least one of horizontal ribs also includes an upper inner radius that is disposed between the innermost radius and the upper outer radius in the cross section, wherein the at least one of the horizontal ribs further includes a lower inner radius that is disposed between the innermost radius and the lower outer radius in the cross section, wherein a sum of the upper inner radius and the lower inner radius is greater than 0.16 inches and less than 0.22 inches.

9. A sidewall portion of a plastic container adapted for vacuum absorption, said sidewall portion comprising:
a plurality of equidistantly spaced horizontal ribs arranged substantially perpendicular to a longitudinal axis of the container and separated by horizontal lands, a cross section of at least one of the horizontal ribs taken parallel to the longitudinal axis being defined by an upper wall, a lower wall, and an inner curved wall that extends between the upper and lower walls, the inner curved wall being curved along an innermost radius, the at least one of the horizontal ribs transitioning to one of the horizontal lands along an upper outer radius, the at least one of the horizontal ribs transitioninq to another of the horizontal lands along a lower outer radius, a sum of the upper and lower radii being at least 0.14 inches and at most 0.28 inches, the at least one of the horizontal ribs defining an acute angle that is variable according to vacuum forces generated within the container and loads directed parallel to the longitudinal axis to thereby accommodate the vacuum forces and the loads directed parallel to the longitudinal axis.

10. The sidewall portion of claim 9 wherein said innermost radius measures between approximately 0.01 inches and approximately 0.03 inches.

11. The sidewall portion of claim 10 wherein said horizontal ribs further define a horizontal rib width and a horizontal rib depth.

12. The sidewall portion of claim 11 wherein a ratio of said horizontal rib width to said horizontal rib depth is preferably within a range of about 1.6 to about 2.0.

13. The sidewall portion of claim 9 wherein said acute angle is variable between a first angle when the container is molded and empty, and a second angle when the container is filled, capped and cooled, wherein a measure of said first angle is greater than a measure of said second angle.

14. The sidewall portion of claim 9, wherein the at least one of horizontal ribs also includes an upper inner radius that is disposed between the innermost radius and the upper outer radius in the cross section, wherein the at least one of the horizontal ribs further includes a lower inner radius that is disposed between the innermost radius and the lower outer radius in the cross section, wherein a sum of the upper inner radius and the lower inner radius is greater than 0.16 inches and less than 0.22 inches.

15. A method of making a blow-molded plastic container comprising:
disposing a preform in a mold cavity; and
blowing said preform against a mold surface of said mold cavity to form an upper portion, a sidewall portion and a base portion, said sidewall portion integrally formed with and extending between said upper portion and said base portion, said base portion closing off an end of the container, said sidewall portion defined in part by a plurality of horizontal ribs arranged substantially perpendicular to a longitudinal axis of the container, at least one of the horizontal ribs disposed longitudinally between an upper land and a lower land, a cross section of the at least one of the horizontal ribs taken parallel to the longitudinal axis being defined by an upper wall, a lower wall, and an inner curved wall that extends between the upper and lower walls, the inner curved wall being curved along an innermost radius, the at least one of the horizontal ribs transitioning to the upper land along an upper outer radius, the at least one of the horizontal ribs transitioning to the lower land along a lower outer radius, a sum of the upper and lower radii being at least 0.14 inches and at most 0.28 inches, the at least one of the horizontal ribs defining an acute angle that is variable according to vacuum forces generated within the container to thereby accommodate the vacuum forces.

16. The method of making a blow-molded plastic container of claim 15 wherein the step of blowing said preform against said mold surface further includes forming said innermost radius to measure between approximately 0.01 inches and approximately 0.03 inches.

17. The method of making a blow-molded plastic container of claim 16 wherein the step of blowing said preform against said mold surface further includes forming said horizontal ribs defining a horizontal rib width and a horizontal rib depth.

18. The method of making a blow-molded plastic container of claim 17 wherein the step of blowing said preform against said mold surface further includes forming said horizontal ribs having a ratio of said horizontal rib width to said horizontal rib depth preferably within a range of about 1.6 to 2.0.

19. The method of making a blow-molded plastic container of claim 15 wherein the step of blowing said preform against said mold surface further includes forming said upper wall, said inner curved wall and said lower wall in combination to form a first angle when the container is molded and empty, and a second angle when the container is filled, capped and cooled, wherein a measure of said first angle is greater than a measure of said second angle.

20. The method of making a blow-molded plastic container of claim 15, wherein the at least one of horizontal ribs also includes an upper inner radius that is disposed between the innermost radius and the upper outer radius in the cross section, wherein the at least one of the horizontal ribs further includes a lower inner radius that is disposed between the innermost radius and the lower outer radius in the cross section, wherein a sum of the upper inner radius and the lower inner radius is greater than 0.16 inches and less than 0.22 inches.

* * * * *

UNITED STATES PATENT AND TRADEMARK OFFICE
CERTIFICATE OF CORRECTION

PATENT NO. : 8,496,130 B2  
APPLICATION NO. : 12/464336  
DATED : July 30, 2013  
INVENTOR(S) : Michael T. Lane et al.

Page 1 of 1

It is certified that error appears in the above-identified patent and that said Letters Patent is hereby corrected as shown below:

In the Claims

Column 7, Claim 1, line 39, after "and", insert --a--.

Column 7, Claim 1, line 50, delete "angel" and insert --angle--.

Column 8, Claim 9, line 27, delete "transitioninq" and insert --transitioning--.

Signed and Sealed this  
Tenth Day of February, 2015

Michelle K. Lee  
*Deputy Director of the United States Patent and Trademark Office*